United States Patent
Clauberg et al.

(10) Patent No.: US 12,289,041 B2
(45) Date of Patent: Apr. 29, 2025

(54) SYSTEM AND METHOD FOR DETERMINING MAINS VOLTAGE OF A POWER SUPPLY

(71) Applicant: SIGNIFY HOLDING B.V., Eindhoven (NL)

(72) Inventors: Bernd Clauberg, Schaumburg, IL (US); Yuhong Fang, Naperville, IL (US); Ashwin Premraj, Des Plaines, IL (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 245 days.

(21) Appl. No.: 18/028,592

(22) PCT Filed: Sep. 29, 2021

(86) PCT No.: PCT/EP2021/076886
§ 371 (c)(1),
(2) Date: Mar. 27, 2023

(87) PCT Pub. No.: WO2022/069602
PCT Pub. Date: Apr. 7, 2022

(65) Prior Publication Data
US 2023/0369957 A1   Nov. 16, 2023

Related U.S. Application Data

(60) Provisional application No. 63/086,678, filed on Oct. 2, 2020.

(30) Foreign Application Priority Data

Oct. 23, 2020   (EP) .................................. 20203517

(51) Int. Cl.
*H02M 1/00*   (2007.01)
*H02M 3/335*   (2006.01)

(52) U.S. Cl.
CPC ..... *H02M 1/0035* (2021.05); *H02M 3/33523* (2013.01)

(58) Field of Classification Search
CPC ........................ H02M 1/0035; H02M 3/33523
See application file for complete search history.

(56) References Cited

U.S. PATENT DOCUMENTS 6,496,392 B2 * 12/2002 Odell ...................... H02M 1/34
363/56.11
10,041,984 B1   8/2018 Price et al.
(Continued)

FOREIGN PATENT DOCUMENTS

| EP | 0386989 A2 | 9/1990 |
| EP | 3043624 A1 | 7/2016 |

*Primary Examiner* — Jue Zhang

(57) ABSTRACT

A secondary side controller configured to determine a peak voltage and/or a frequency of a secondary side winding of a power supply converter over a predetermined period of time, wherein, when the converter is in the burst mode, the secondary side controller is configured to instruct a primary side controller to increase the set point, such that the primary side controller operates in the standard mode to increase the converted output voltage, the secondary side controller determining the peak voltage and/or the frequency of the secondary side winding while the primary side controller is operating the converter in the standard mode.

13 Claims, 6 Drawing Sheets

(56) References Cited

U.S. PATENT DOCUMENTS

2008/0278973 A1* 11/2008 Lin .................. H02M 3/33523
    363/21.08
2010/0309694 A1* 12/2010 Huang .................. H02M 1/14
    363/49

* cited by examiner

SYSTEM AND METHOD FOR DETERMINING MAINS VOLTAGE OF A POWER SUPPLY

CROSS-REFERENCE TO PRIOR APPLICATIONS

This application is the U.S. National Phase application under 35 U.S.C. § 371 of International Application No. PCT/EP2021/076886, filed on Sep. 29, 2021, which claims the benefits of European Patent Application No. 20203517.6, filed on Oct. 23, 2020, and United States Application No. 63/086,678, filed on Oct. 2, 2020. These applications are hereby incorporated by reference herein.

FIELD OF THE DISCLOSURE

The following relates to systems and method for determining a mains voltage of a power supply, and, specifically, to determining a mains voltage of a power supply when a converter of the power supply is operating in burst mode.

BACKGROUND

Currently, many LED drivers are designed with an isolated output and use a secondary side controller to regulate the output voltage or current to the target value. With the evolution of LED drivers to digital interfaces such as DALI or similar, LED drivers are also adding more and more diagnostic capabilities. In addition, standards organizations such as DiiA are requiring certain diagnostics for products that will carry the D4i Logo. These diagnostics include items like LED voltage and current, but also mains-voltage-related items such as mains voltage, power factor, and mains frequency. Measuring mains related parameters is challenging in many of these isolated topologies, as the secondary side controller is isolated from the primary side at which the mains voltage is received. Therefore, it is desired to measure these diagnostic items directly from the secondary side in instances in which the controller is isolated on from the primary side.

Furthermore, if the input stage operates in burst mode due to light load conditions, then the sensing of the mains voltage and frequency from the isolated secondary side becomes less accurate because the burst operation is not linked to the mains voltage and frequency. Accordingly, there exists a need in the art to determine mains voltage and frequency from the secondary side of a power supply, particularly when the power supply input stage can operate in a burst mode or a standard mode.

SUMMARY OF THE DISCLOSURE

The examples described herein can be combined in any way technically possible.

According to an aspect, a power supply having secondary side mains measurement, includes: a converter configured to receive an input voltage and to supply a converted output voltage, the converter comprising a transformer having a primary side winding and a secondary side winding, the transformer defining a primary side and the secondary side of the power supply, the primary side being galvanically isolated from the secondary side, and a switch positioned to interrupt or permit a flow of current through the primary side winding of the transformer; a primary side controller configured to operate the converter via a drive signal provided to the switch, the primary side controller operating the converter to maintain the converted output voltage at a target set point, wherein the converter is operated in a burst mode when a resistance of a load connected to an output terminal of the power supply is above a threshold and in a standard mode when the resistance of the load is below the threshold or when the primary side controller is operating the converter to increase the converted output voltage; and a secondary side controller configured to determine a peak voltage and/or a frequency of the secondary side winding over a predetermined period of time, wherein, when the converter is in the burst mode, the secondary side controller is configured to instruct the primary side controller to increase the set point, such that the primary side controller operates in the standard mode to increase the converted output voltage, the secondary side controller determining the peak voltage and/or the frequency of the secondary side winding while the primary side controller is operating the converter in the standard mode.

In an example, the secondary side controller is configured to provide to a remote computing device an estimated mains voltage and/or mains frequency based on the peak voltage and/or the frequency.

In an example, the secondary side controller is further configured to instruct the primary side controller to decrease the set point.

In an example, the secondary side controller is configured to instruct the primary side controller to increase the set point by varying an error signal provided to the primary side controller.

In an example, the power supply further includes an amplifier configured to produce the error signal, the amplifier receiving a first input representative of the converted output voltage and a second input being a reference input, the error signal being based on a difference between the converted output voltage and the reference input, wherein the secondary side controller is configured to vary the error signal feedback by adjusting the reference input.

In an example, the converter is a flyback converter.

In an example, the primary side controller is a power factor correction controller.

In an example, the secondary side winding is an auxiliary winding.

In an example, the set point is increased over a predetermined period of time such that the primary side controller operates the converter in the standard mode for a temporary length of time sufficient to measure the peak voltage and/or the frequency.

In an example, the set point is increased by a predetermined amount selected such that the primary side controller operates the converter in the standard mode for a length of time sufficient to measure the peak voltage and/or the frequency.

According another aspect, a microcontroller comprising a processor and a non-transitory storage medium, the non-transitory storage medium storing program code that, when executed by the processor, includes the steps of: determining a peak voltage and/or frequency of a secondary side winding of a transformer over a predetermined period of time, wherein the transformer being employed in a converter of a power supply, the converter configured to receive an input voltage and to supply a converted output voltage, wherein the transformer defines a primary side and a secondary side of the power supply, the primary side being galvanically isolated from the secondary side, wherein the converter further comprises a switch positioned to interrupt or permit a flow of current through a primary side winding of the transformer, wherein the microcontroller is disposed on the secondary side of the power supply; determining according to the peak voltage and/or the frequency whether a primary side controller, configured to operate the converter via a drive signal provided to the switch, is operating in a burst mode or a standard mode, wherein the primary side controller operates the converter to maintain the converted output voltage at a target set point; instructing the primary side controller to increase the set point such that the primary side controller operates in the standard mode to increase the converted output voltage; and determining the peak voltage and/or the frequency of the secondary side winding while primary side controller is operating the converter in the standard mode.

In an example, the program code further includes the step of providing to a remote computing device an estimated mains voltage and/or mains frequency based on the peak voltage and/or frequency of the secondary side winding determined while the converter is operated in the standard mode.

In an example, the program code further includes the step of instructing the primary side controller to decrease the set point after determining the peak voltage and/or the frequency of the secondary side winding.

In an example, instructing the primary side controller to increase the set point comprises varying an error signal provided to the primary side controller.

In an example, varying an error signal comprises increasing a reference voltage of an error amplifier, the error amplifier comparing the converted output voltage to the reference voltage.

In an example, the converter is a flyback converter.

In an example, the primary side controller is a power factor correction controller.

In an example, the secondary side winding is an auxiliary winding.

In an example, the set point is increased over a predetermined period of time such that the primary side controller operates the converter in the standard mode for a length of time sufficient to measure the peak voltage and/or the frequency.

In an example, the set point is increased by a predetermined amount selected such that the primary side controller operates the converter in the standard mode for a length of time sufficient to measure the peak voltage and/or the frequency.

These and other aspects of the various embodiments will be apparent from and elucidated with reference to the embodiment(s) described hereinafter.

DETAILED DESCRIPTION OF EMBODIMENTS

Figure 1:
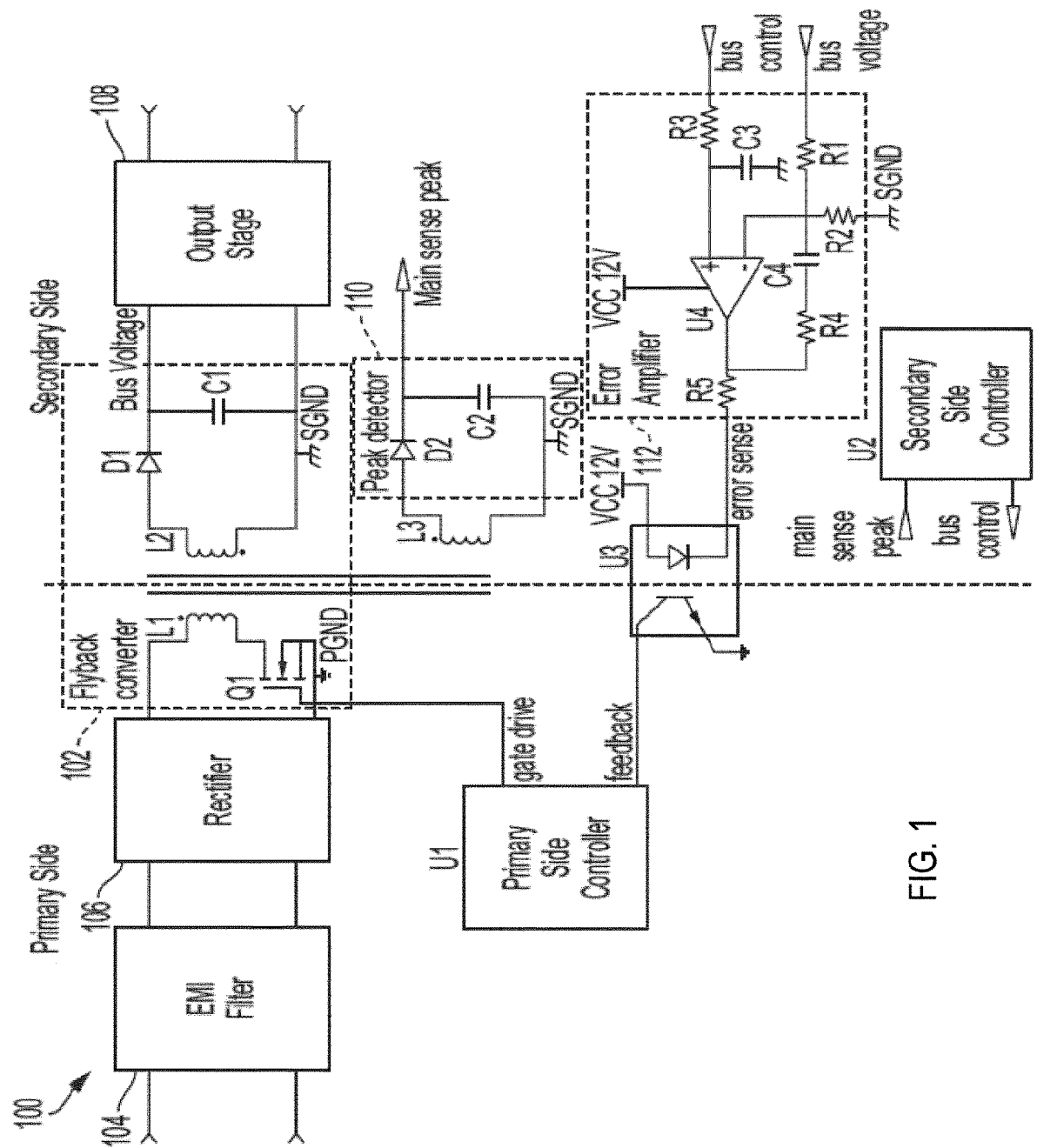
FIG. 1 is a schematic of a power supply including a secondary side controller configured to measure the mains voltage from a voltage of a secondary side winding of a transformer.

Various examples described herein are directed toward a system and method for determining a mains voltage from a secondary side of a power supply, when the power supply is operating in a standard mode or in a burst mode. FIG. 1 depicts a power supply 100, having a converter that employs a transformer maintaining galvanic isolation between a primary side and a secondary side, configured to detect the mains voltage and/or frequency from the secondary side. As shown in FIG. 1, power supply 100 includes a flyback converter 102 receiving an input voltage derived from a mains voltage and operated by a primary side controller U1 to maintain a converted output voltage (bus voltage) at a target set point. Power supply 100 includes a transformer (comprised in FIG. 1 of windings L1, L2, and L3) employed in flyback converter 102 and defining a primary side and secondary side of power supply that are galvanically isolated from one another. Power supply 100 further includes a secondary side controller U2 configured to determine the mains voltage and/or mains frequency according to a secondary side winding of flyback.

For the purposes of this disclosure, a flyback converter 102 includes the transformer (formed by windings L1, L2, and L3), a switch Q1, an output diode D1, and an output capacitor C1. The transformer galvanically isolates a primary side of the power supply, which receives an input mains voltage, from a secondary side, which outputs a converted output voltage, referred to in this disclosure and shown in FIG. 1 as bus voltage. The transformer includes a primary winding L1 magnetically coupled to a secondary winding L2 and an auxiliary winding L3. The current through the primary side of the transformer is controlled by switch Q1 (e.g., a MOSFET, although any suitable switch can be used) disposed to alternately interrupt or permit the flow of current through the primary winding L1. The voltage of the secondary winding L2, induced by the magnetic field of the primary winding, is rectified by diode D1 and smoothed by capacitor C1. The voltage across capacitor C1, i.e., bus voltage, is the converted output voltage of the flyback converter 102.

The operation of a flyback converter 102 is generally understood, and so only a brief summary will be provided here for the sake of completeness. When switch Q1 is closed, current is permitted to flow through the primary winding L1, storing energy in the transformer. This phase, when switch Q1 is closed and current is flowing through primary winding L1, is known as "forward phase." Because the secondary winding L2 is wound in the opposite direction to the primary winding L1, diode D1 will be reverse biased in the forward phase, preventing current flow through secondary winding L2. Once switch Q1 opens—beginning the phase known as the "flyback phase"—the transformer will begin discharging, and the voltage across secondary winding L2 will reverse, forward-biasing diode D1 and charging capacitor C1. By discharging transformer through diode D1 multiple times per mains cycle, the voltage across capacitor C1 is kept substantially constant, forming the target converted output voltage (bus voltage) at the output of flyback converter 102.

One of ordinary skill in the art will appreciate that flyback converter 102 is simplified for the purposes of clarity. In various alternative examples, flyback converter 102 can include additional components to improve performance. One such addition to flyback converter 102 is a clamping circuit disposed across primary winding L1, in order to reduce ringing waveforms at the drain of switch Q1 introduced due to stray capacitances in flyback converter 102. Such clamping circuits, which are connected in parallel with the primary winding L1, can include for example, the parallel combination of a resistor and capacitor connected in series with a reverse-biased diode. This clamping circuit serves absorb leaking current once the drain voltage exceeds capacitor voltage, thus damping the ringing. Other circuits (e.g., an RC snubber circuit) can be similarly introduced to flyback converter 102 to improve performance.

While flyback converter 102 is shown in FIG. 1, it should be understood that a flyback converter is only one example of a type of converter that can be used in power supply 100. Indeed, any suitable converter employing a transformer to maintain galvanic isolation from the primary side and secondary side of the transformer can be used (e.g., an active clamp forward converter, a single switch forward converter, a two switch forward converter, a push-pull converter, a half bridge converter, a full bridge converter, etc.). The operation of such alternative converts are generally understood and so will not be described in detail.

Power supply 100 can further include input stages to flyback converter 102, designed to condition the mains voltage input to the flyback converter 102 in a manner that advantageously improves performance of flyback converter 102. For example, power supply 100 can include an EMI filter 104 and rectifier 106. EMI filter 104 functions to eliminate high frequency noise present on the input mains voltage. Such EMI filters 104 are well known in the art and can include, in various examples, some combination of across-the-line capacitors, common mode choke coils, line bypass capacitors, and normal mode choke coils, among other potential components. Rectifier 106 functions to rectify the input AC mains voltage and can be formed from, e.g., a diode bridge. Other input stages to appropriately condition the mains voltage for use by the converter are conceivable and can included in various alternative examples.

Likewise, power supply 100 can include output stages, represented here by output stage 108. Output stage 108 can function to further condition the output voltage of flyback converter 102. Output stages 108 can be, in various examples, additional converters, such as buck converters, in order to step down the bus voltage to some target value. The output of power supply 100 thus can be the output of the output stage, rather than the converted output voltage (bus voltage) of the flyback converter 102 (or other converter used). Furthermore, it should be understood that additional or alternative kinds of output stages can be employed to further condition the bus voltage (e.g., step down or step up, smooth, etc.) as appropriate.

Primary side controller U1 supplies the gate drive signal to the switch Q1 to maintain a target output voltage (alternatively referred to as the "set point") or output current (maintaining a target output current can be conceived of as setting the voltage to a target output voltage in response to a resistance of a given connected load). While any number of suitable primary side controllers (comprising an analog controller or microcontroller or a combination of one or more microcontroller(s) and associated hardware) can be employed to regulate the output voltage or current, the primary side controller U1 is typically employed as a power factor correction (PFC) controller. PFC controllers are analog controllers or microcontrollers designed to regulate the output of the power supply by varying the gate drive signal, in order to maintain the power factor and output voltage or current of the power supply at the target voltage or current value. As mentioned above, the target power factor and/or the target output voltage need not be the constant but can vary according to context. For example, in some examples, the set point can vary according to the load resistance in order to maintain current at a constant value.

Depending on the magnitude of the load connected to the output terminals, primary side controller U1 will either operate in a standard mode or a burst mode. More specifically, when the load resistance is less than a particular value (alternatively referred to as a threshold or threshold value), primary side controller will operate in the standard mode, described above, since the power consumed by the load is greater than the power threshold required to operate in the standard mode. However, when the resistance of the load is greater than the threshold value, the primary side controller U1 will operate in a burst mode, in which the gate drive signal is provided to close switch Q1 at a frequency that is substantially less than the frequency during operation in the standard mode, since the power consumed by the load is less than the power threshold required to operate in the standard mode.

During the forward phase of each switching cycle, energy is stored in primary magnetizing inductance of the transformer, and output capacitor C1 is discharged to the load. During flyback phase, the energy stored in primary side is released to secondary side, and the output capacitor C1 is charged. During the operation of the standard mode, charged and discharged energy within each switching cycle are balanced. Burst mode occurs because, when the load resistance is high, output capacitor C1 discharges at a substantially slower rate than when the output load resistance is low. The energy stored in the primary side has a minimum limit based on the controller. As a result, during the flyback phase, the output voltage of capacitor C1 is quickly charged to or above the target output voltage, a voltage that does not discharge during the next forward phase as would normally occur with a lower-resistance load. Accordingly, primary side controller U1 increases time between successive forward phases (i.e., the time between successively closing switch Q1) to avoid charging the capacitor C1 to a value above the target output voltage, as would occur if the primary side controller U1 continued in the standard mode. The precise nature of the burst mode (e.g., the frequency and magnitude of the bursts provided) will be vary from primary side controller to primary side controller.

In order to regulate the bus voltage, primary side controller U1 can receive a feedback error signal representative of bus voltage error, that is, the degree to which the bus voltage departs from the target voltage. The feedback error signal can, for example, be based on a comparison of the output voltage or current to a reference signal. This is shown in FIG. 1, in which error amplifier 112 produces an output based on a difference between the bus voltage and a reference signal (bus control). This output error sense signal can be delivered to primary side controller U1 via optocoupler U3 to maintain galvanic isolation between the primary side and secondary side. Flyback converter adjusts the pulse width of the gate drive signal (i.e., pulse-width modulation) in response to the magnitude of the feedback signal received from the error amplifier 112 or the secondary side controller U2 via the optocoupler U3, in order to maintain the bus voltage at the target set point.

Error amplifier 112 can take a variety of suitable forms. In the example of FIG. 1, error amplifier comprises an operational amplifier U4 and resistors R1, R2, R3, and R4. Operational amplifier outputs a signal proportional (i.e., with some gain) to the difference between the inputs at R1 and R3, which, in this example, are the bus voltage and bus control inputs. In addition, capacitors C3 and C4 form a compensation network selected to address overshoot and undershoot problems when the voltage at the inputs sees some rapid change. The values of R1-R5 and C3-C4 are design choices that can be selected to set the gain of the output and the degree to which undershoot and overshoot are prevented. Furthermore, it should be understood that the example of error amplifier 112, as structured in FIG. 1, with the associated components of R1-R5 and C2-C3, is only one example of a suitable error amplifier. In various alternative examples, error amplifier 112 can be formed by any circuit suitable for detecting and providing an error signal proportional to a difference between the bus voltage and a reference signal.

The inputs to error amplifier 112 in this example are the bus control signal, which is the reference signal to which the other input, bus voltage, is compared. The output of error amplifier 112 is thus proportional to the difference between the bus voltage and bus control reference signal. As will be described below, the bus control signal can be supplied by the secondary side controller U2. Thus, in this example, the reference to which the bus voltage is compared is dictated by secondary side controller U2.

In an alternative example, the comparison between the bus voltage and the reference voltage can occur within secondary side controller U2, and thus be performed completely by firmware or software (omitting error amplifier 112). In this example, the bus voltage is provided to microcontroller U2, which compares this input (with an internal comparator) to a reference voltage. The reference voltage can be generated internally or can be received at a reference voltage input to controller U2. Further, in this example, the difference between the bus voltage and the reference voltage can be output from secondary side controller U2 to primary side controller via optocoupler U3.

In the above examples, it should be understood that the bus voltage input to either error amplifier 112 or to secondary side controller U2 can be provided to the error amplifier 112 or to secondary side controller U2 as a voltage representative of the bus voltage. More particularly, because the bus voltage can, in some examples, be comparatively high, the bus voltage can be stepped down prior to being input to error amplifier 112 or secondary side controller U2. Thus, the bus voltage input to error amplifier 112 or to secondary side controller U2 can be an input that is proportional to the bus voltage, rather than the bus voltage itself.

When primary side controller U1 is in the standard mode and the flyback converter 102 is in the forward phase (i.e., when switch Q1 is closed and current is flowing through primary winding L1) the voltage across any secondary side winding of the transformer (e.g., L2 or L3) will be proportional to the mains voltage. And thus, the mains voltage can be detected on the secondary side by measuring the voltage across either the secondary winding L2 or the auxiliary winding L3. In this way, the voltage across the secondary side windings of the transformer can serve as a proxy by which the voltage of the mains can be measured at the secondary side of the power supply.

In the example of FIG. 1, auxiliary winding L3 is used instead of the secondary winding L2 because auxiliary winding L3 typically includes fewer turns and thus the output voltage is lower. As a result, less power is consumed when the voltage of auxiliary winding L3 is stepped down to be measured, and there are fewer grounding issues which can arise at the typically higher-powered secondary winding L2. Furthermore, it should be understood that auxiliary winding L3 is only one example of an auxiliary winding that can be used. Indeed the transformer can include any number of potential auxiliary windings, any of which can be used to detect the mains voltage and/or frequency as appropriate. Indeed, although the below description in conjunction with FIG. 1 will refer to the voltage across the auxiliary winding L3, it should be understood that any secondary side winding can be used.

In the example of FIG. 1, secondary side controller U2 measures the auxiliary winding L3 voltage at the input labelled mains peak. This input is the output of peak detector 110 which is connected across auxiliary winding L3. Because the auxiliary winding L3 voltage is only proportional to the rectified mains voltage when the flyback converter is in the forward phase, peak detector 110 is utilized to detect the peak (i.e., the envelope) of the voltage of the auxiliary winding L3, thus reproducing a signal substantially proportional to the mains voltage at the input of secondary side controller U2. By measuring the peak detected auxiliary winding L3 voltage for a predetermined period of time (e.g., for a half cycle of the mains voltage), the peak voltage of auxiliary winding can be measured (the peak voltage referring to the maximum voltage occurring within the periodic half cycle of the mains voltage). The peak voltage of the auxiliary winding is proportional to the peak voltage of the mains voltage, and thus can be used to determine the mains voltage value (e.g., as a peak-to-peak or RMS value).

In addition, by measuring the time elapsed between zero-crosses, or some other repeated identifiable part of the waveform (e.g., the peak), of the voltage of the auxiliary winding, the frequency of the mains voltage can be identified by secondary side controller U2. The time between zero crosses or other repeated identifiable part of the waveform can be measured, for example, by counting microcontroller clock cycles (of secondary side controller U2 clock) between successive instances of the zero cross or identifiable part. The determined mains voltage and/or frequency can be output to a connected or remote device as diagnostic information according to the methods described in more detail below.

Secondary side controller U2 can be implemented, in various examples, as one or more microcontroller(s), as hardware, or as combination of one or more microcontroller(s) and hardware, configured to carry out the steps and functions described in this disclosure.

In the example shown, peak detector 110 can be comprised of diode D2 and capacitor C2. Diode D2 permits current to flow, charging capacitor C2, when flyback converter 102 is in forward phase and blocks current flow when flyback converter 102 is in the flyback phase. Because capacitor C2 will not immediately discharge when flyback converter 102 is in the forward phase, the voltage across capacitor C2 will follow the envelope of the forward phase voltage and accurately represent the rectified mains voltage signal.

In an alternative example, peak detector 110 can further include circuitry (e.g., a voltage divider) for stepping down the voltage across the auxiliary winding (e.g., to bring the voltage within the voltage range allowable at an input of the secondary side controller U2). Furthermore, it should be understood that the peak detector 110 of FIG. 1 is only provided as an example and that any suitable peak detector can be used. In an alternative example, the peak detection can be performed internally to controller U2 (e.g., in software or firmware) and thus peak detector 110 can be omitted.

However, when primary side controller U1 operates in burst mode, the voltage of the auxiliary winding cannot be easily related to the mains voltage. Indeed, the auxiliary winding L3 voltage represents the rectified mains voltage during the burst, but these bursts may not happen at the peak of the rectified mains voltage and the burst repetition rate is not linked to the mains frequency, and so the voltage and frequency of the rectified mains voltage is not discernible.

Figure 2A:
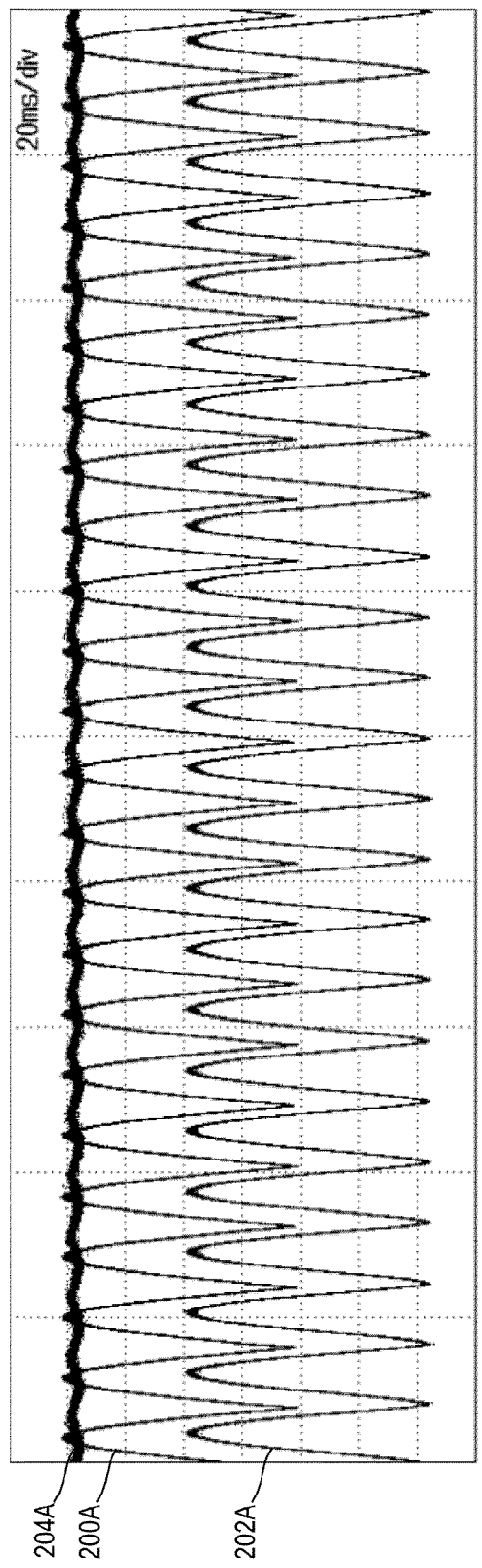
FIG. 2A is a plot of a rectified mains voltage, auxiliary winding voltage, and bus voltage of a power supply with a flyback converter operated in the standard mode.
Figure 2B:
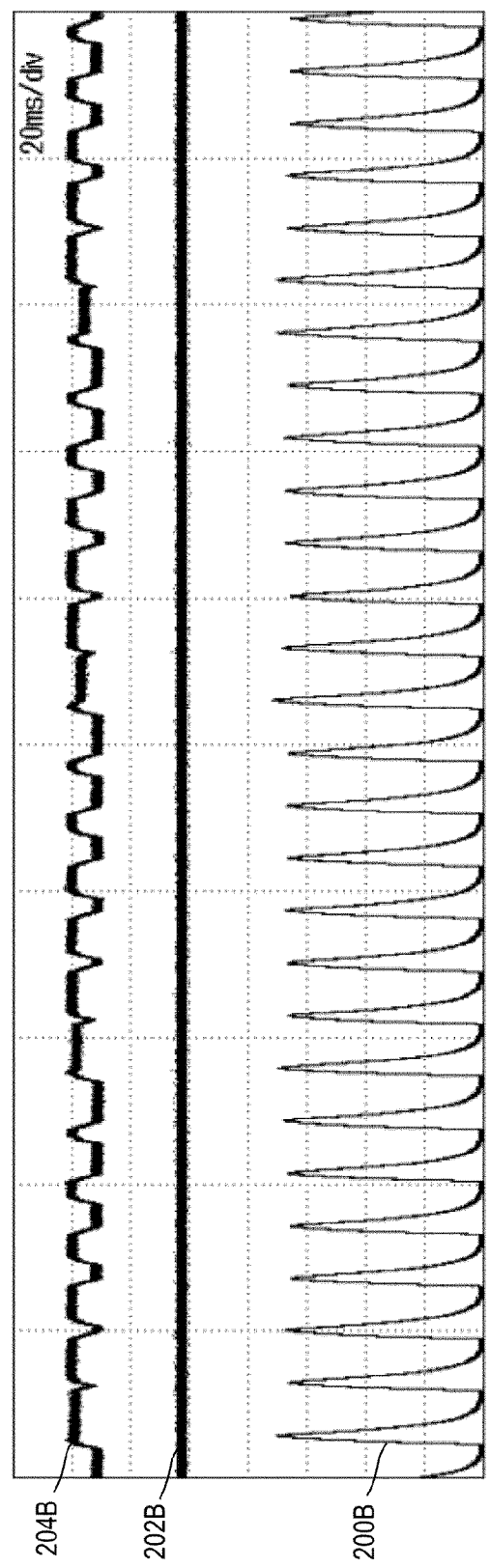
FIG. 2B is a plot of a rectified mains voltage, auxiliary winding voltage, and bus voltage of a power supply with a flyback converter operated in the burst mode.

This can be shown by contrasting FIGS. 2A and 2B, which depict plots of the peak detected auxiliary winding voltage, rectified mains voltage, and the converted output voltage during standard mode (FIG. 2A) and burst mode (FIG. 2B). As shown in FIG. 2A, the peak detected auxiliary winding voltage 200A largely follows an example peak detected rectified mains voltage 202A (measured at the input to the primary winding). However, as shown in FIG. 2B, in the burst mode, given how infrequently the primary side winding is conducting, the peak detected rectified mains voltage 202B does not resemble the mains voltage in magnitude or frequency. Thus, no meaningful information about the mains voltage can be ascertained from the peak detected auxiliary voltage 200B, which follows the bursts of the primary winding L1.

Secondary side controller U2 can therefore be configured to detect when primary side controller U1 is operating in burst mode and be configured to increase the voltage set point of the primary side controller U1, drawing primary side controller U1 out of burst mode and into standard mode of operation as primary side controller U1 increases the output bus voltage, before measuring the mains voltage at the secondary side of transformer.

Figure 3:
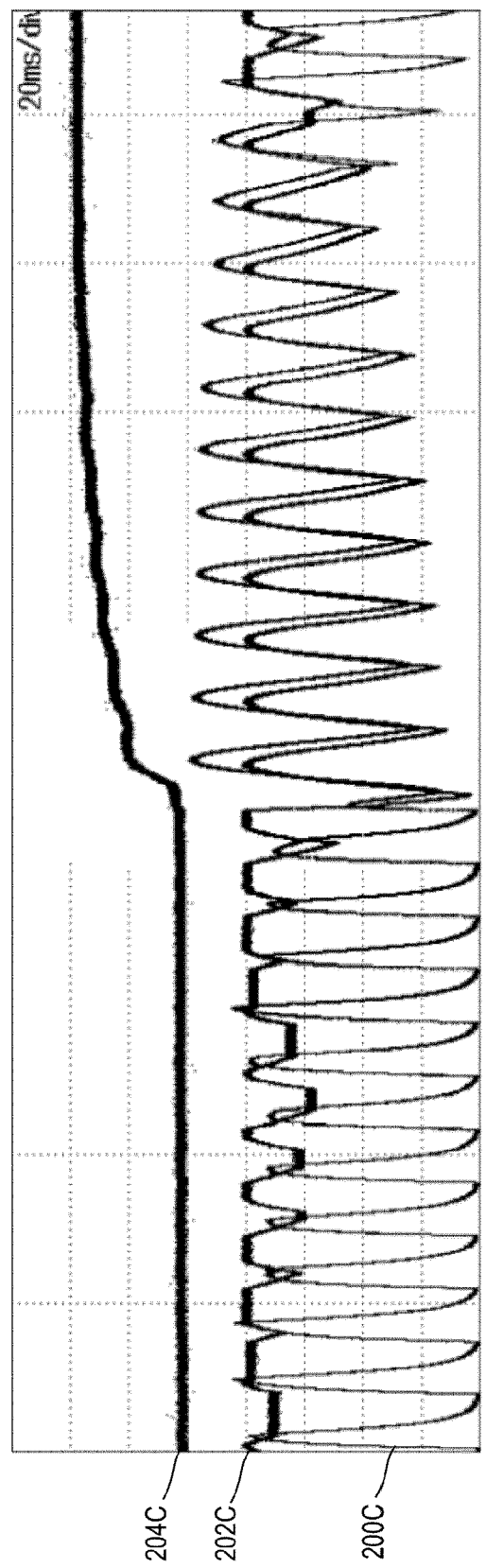
FIG. 3 is a plot of a rectified mains voltage, auxiliary winding voltage, and bus voltage of a power supply with a flyback converter as a voltage set point of the converter is increased.

FIG. 3 shows what happens to the signals shown in FIG. 2 when the bus voltage is forced to a new setpoint in a typical LED driver operating in burst mode. As shown, as soon as the bus voltage 204C set point is increased by secondary side controller U2, the primary side controller U1 tries to build the bus voltage back to the new set point and in doing so, forces it into a non-burst operation for nearly 10 mains half-cycles. During these cycles, the peak detected rectified mains voltage at the primary winding 202C and the peak detected auxiliary winding L3 voltage 200C accurately correspond to the input mains voltage and both voltage and frequency of the mains can be accurately determined during this time.

By adjusting the voltage step large enough, it can be ensured that the primary side controller U1 remains in standard mode for at least one half cycle of the rectified mains signal so that the peak voltage is captured. Alternatively, the voltage step can be made large enough to ensure that the primary side controller U1 remains in standard mode for at least one rectified mains cycle, so that at least two zero crossings are detected and the mains frequency can be determined as well.

However, depending on primary side controller U1, even a large voltage step will not ensure that primary side controller U1 remains in normal operation for a half cycle or full cycle, as primary side controller U1 can reach the large voltage step in a time shorter than a half cycle. Accordingly, secondary side controller U2 can increase the set point multiple times, or continuously, over the course of a half cycle or full cycle, ensuring that the flyback converter continues in standard mode for the length of time required to capture the mains voltage or frequency as it attempts to meet the changing set point.

In the example of FIG. 1, secondary side controller U2 can change the set point by changing the bus control input to the amplifier in a manner that changes the error signal, representing to primary side controller U1 that the bus voltage is too low. Stated differently, the secondary side controller U2 can increase the bus control voltage, increasing the difference between the bus voltage and the bus control voltage, and, consequently, increasing the magnitude of the error signal feedback to primary side controller U1. As a result, primary side controller U1, receiving feedback that the bus voltage is too low, enters normal operation to increase the bus voltage.

In alternate embodiment, secondary side controller U2 can output a signal directly to the primary side controller U1 (via, e.g., optocoupler U3) to increase the voltage set point independent of error amplifier 112. For example, the output of secondary side controller U2 can be supplied to the feedback input of secondary side controller U2 in addition to or as alternative to the feedback input from error amplifier 112. For example, as described above, secondary side controller U2 can replace error amplifier 112 and perform the comparison between the bus voltage a reference signal. In this example, the error sensor signal is provided from secondary side controller U2 to primary side controller U1, rather than from error amplifier 112. In another example, a feedback signal can be provided to primary side controller U1 from both secondary side controller U2 and error amplifier 112. For example, both error sense signal and the output from secondary side controller U2 can be provided to optocoupler, the greater of which determining the feedback signal input to primary side controller U1, allowing secondary side controller U2 to override the feedback input from error amplifier 112 and set the voltage output accordingly.

In another example, a pin besides the feedback pin to primary side controller U1 can be used to increase the set point. For example, primary side controller U1 can include a set point pin, the input to which dictates the set point of the bus voltage. In this example, secondary side controller U1 can change the input to this pin in order to raise the point and cause the controller U1 to enter the standard mode at least long enough to measure the mains voltage and frequency.

Once secondary side controller U2 has increased the set point in a manner that ensures that primary side controller U1 operates in the standard mode for a length of time sufficient to capture the mains voltage and/or frequency, secondary side controller U2 can lower the set point back to previous value. In the example of FIG. 1, this can be accomplished by lowering the bus control signal back to the value it was before the increase. The bus control signal can remain the lower value until the mains voltage and/or frequency needs to be read again, at which time the set point can be increased again.

Secondary side controller U2 can determine whether primary side controller U1 is in a burst mode by comparing the voltage or frequency of the auxiliary winding L3 to a threshold. When primary side controller U1 is in the burst mode, the output of auxiliary winding L3 will not rise above a particular threshold and will not exceed a particular frequency. Thus, by monitoring the auxiliary winding L3 for a half-cycle (for comparing the voltage to a threshold) or full cycle (for comparing the frequency to a threshold), secondary side controller can determine whether primary side controller U1 is in burst mode.

Secondary side controller U2 can be configured to determine the mains voltage and frequency from the measured auxiliary winding voltage. The peak auxiliary winding voltage in a given half cycle will likely be related to the mains voltage by some constant of proportionality. Secondary side controller U2 can thus be configured to determine the mains voltage by multiplying the measured peak voltage of the auxiliary winding by the constant of proportionality. The frequency of the auxiliary winding will likely be the same as the mains voltage frequency—however, to the extent that intervening circuits alter the measured frequency at the secondary side controller, the secondary side controller likewise convert the measured frequency to the frequency of the mains voltage.

Secondary side controller U2 can be configured transmit the measured mains voltage in a wired or wireless manner, over any suitable protocol (e.g., DALI, Bluetooth, ZigBee, NFC, etc.) to a remote device. Indeed, as described above, certain standards organizations such as DiiA are requiring products that carry D4i Logo be capable of providing diagnostic information such as output voltage and frequency and mains-voltage-related items such as mains voltage, mains frequency, and power factor. Such a remote device can be a mobile device or computer. The remote device can be configured to display the diagnostic information to a user, e.g., with a dashboard, so that the user can monitor the mains voltage and/or frequency.

In an alternative example, rather than only varying the set point to determine the mains voltage and/or frequency, secondary side controller U2 can be configured to regularly vary the voltage set point to increase the efficiency of the flyback converter. More specifically, in instances in which the value of the bus voltage is irrelevant (i.e., when the power supply is in standby) the bus voltage set point can be continually varied to retain the primary side controller U1 in normal operation. In these examples, the output stage 108 can be off so that the bus voltage is not present at the power supply output terminals. Burst mode is far less efficient than normal operation, and so when the power supply is in standby, secondary side controller U2 can continue varying the bus voltage set point such that the primary side controller U1 does not enter burst mode or enters burst mode with less regularity.

Figure 4A:
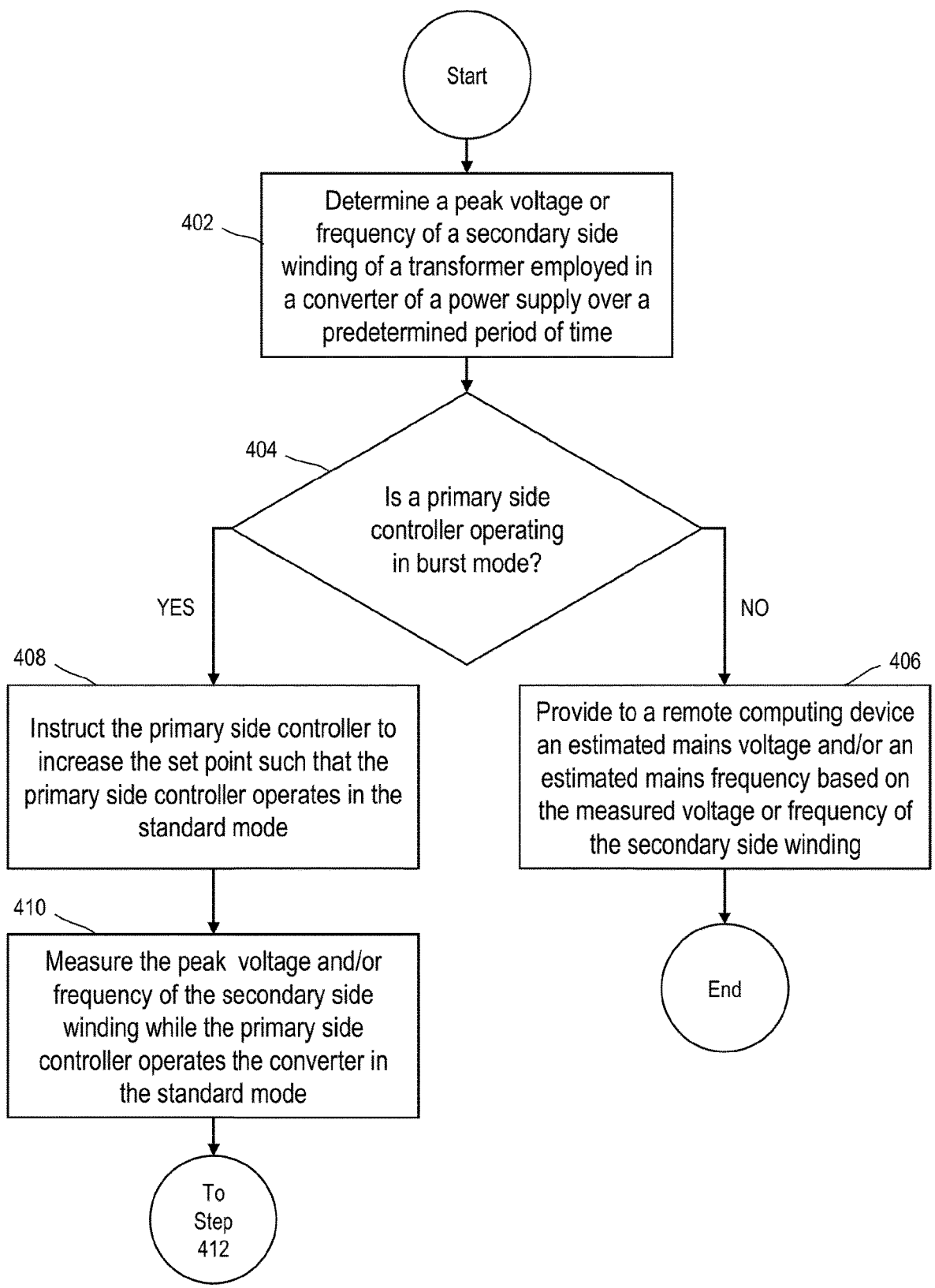
FIG. 4A is a method of determining the mains voltage from a secondary side winding of a power supply with a converter operable in a standard mode or a burst mode.
Figure 4B:
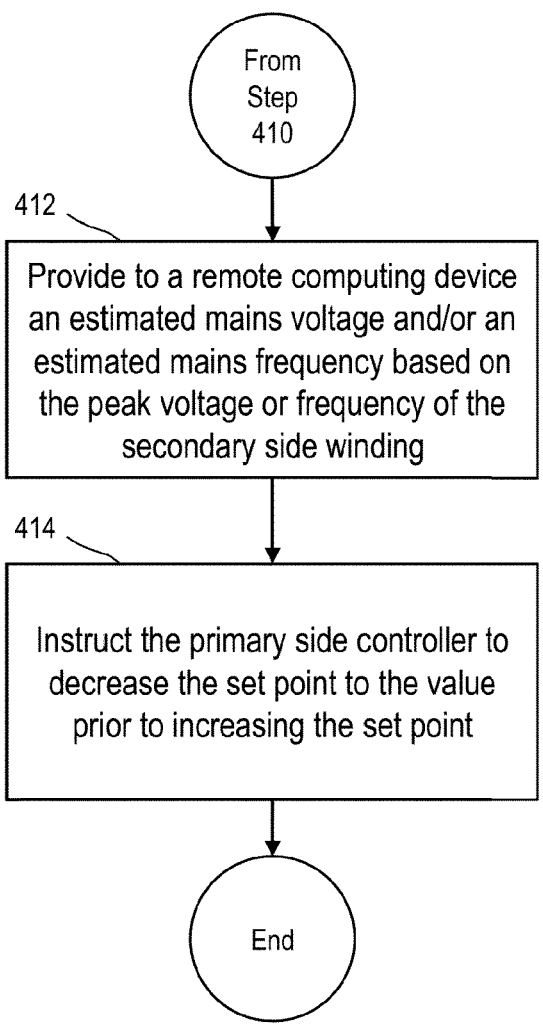
FIG. 4B is a method of determining the mains voltage from a secondary side winding of a power supply with a converter operable in a standard mode or a burst mode.

FIG. 4 depicts a flowchart of a method 400 for determining the mains voltage and/or frequency from the secondary side of a power supply having a converter that employs a transformer maintaining galvanic isolation between a primary side and a secondary side of the power supply. In an example, the converter can be a flyback converter, however, any converter utilizing such a transformer can be used (e.g., an active clamp forward converter, a single switch forward converter, a two switch forward converter, a push-pull converter, a half bridge converter, a full bridge converter, etc.). Such a power supply can be power supply 100, shown and described in connection with FIG. 1; however, this is only provided as an example. The method steps of FIG. 4 can be carried out by a controller, such as secondary side controller U2. The method steps can be programmed in non-transitory storage as software or firmware and carried out by a processor of a microcontroller. However, in some examples, some of the steps can be carried out in hardware, or as a combination of hardware, software, and/or firmware.

At step 402, the voltage across a secondary side winding of the transformer is measured for a predetermined period of time from which the peak voltage from the period of time or the frequency of the measured voltage from the period of time can be determined. The secondary side winding can be either the secondary winding or an auxiliary winding of the transformer (the transformer can include any number of auxiliary windings). The predetermined period of time can be a period of time typically sufficient to capture a half cycle or a full cycle of the mains voltage. The voltage across the secondary side winding can be measured in conjunction with a peak detector, which finds the envelope of the voltage, since the voltage will only represent the mains voltage when the converter is in the forward phase. Any suitable peak detector can be used.

At step 404, it is determined whether a primary side controller (e.g., primary side controller U1) is operating in a burst mode. In an example, the primary side controller is a PFC controller, which is an integrated circuit designed to operate a converter such as a flyback converter. In an example, in order to determine whether the primary side controller is operating in burst mode, the measured voltage or frequency of the secondary side winding is compared to a threshold. If the measured voltage or frequency is less than the threshold, it can be determined that the primary side controller is operating in burst mode, otherwise it can be determined that the primary side controller is operating in the standard mode.

At step 406, if it is determined that primary side controller is in the standard mode, the measured voltage and/or frequency of the secondary side winding is provided to remote computing device, such as a mobile device or computer, as diagnostic information. In one example, the measured voltage and/or frequency can be stored in secondary side controller memory until the diagnostic information is requested by the remote computing device. The diagnostic information can be transmitted either wired or wirelessly through any suitable protocol, such as DALI, Bluetooth, ZigBee, NFC, etc. In an example, the measured voltage can be converted to the mains voltage according to some constant of proportionality, as the magnitude of the measured voltage across the secondary side winding will be determined by the number of turns of the secondary side winding relative to the primary side winding, and any intervening circuitry between the secondary side winding and secondary side controller (e.g., peak detector, voltage dividers, etc.). Likewise the mains frequency can be determined from auxiliary winding either directly (as they can be the same) or through some conversion process, e.g., multiplication by a constant of proportionality.

At step 408, if it is determined that primary side controller is operating in burst mode, the primary side controller can be instructed to increase the voltage set point of the converter output voltage (bus voltage). The instruction to increase the voltage set point can be made by, for example, increasing an error signal that is fed back to the primary side controller, such that the primary side controller increases the output voltage (thus, entering the standard mode) to address the increased error. The error signal can be increased by, for example, increasing the reference voltage of an error amplifier, or by increasing an error signal provided to the primary side controller directly (through an optocoupler) from the secondary side controller.

The primary side controller can be instructed to increase the voltage set point in a manner that causes the primary side controller to remain in the standard mode for a time period sufficient to measure the mains voltage or mains frequency (at least a half cycle or a full cycle of the mains voltage, respectively). This can be accomplished by setting the increase of the set point high enough to ensure that the primary side controller will remain in the standard mode for the requisite period of time. Alternatively, the set point can be increased over time (e.g., over a half cycle or a full cycle), ensuring the primary side controller continues to operate in the standard mode to meet the changing voltage requirement.

At step 410, the voltage and/or frequency of the secondary side winding is measured while the primary side controller is operating in the standard mode due to the voltage output set point in crease of step 408. As described in connection with step 402, the secondary side winding can be measured in conjunction with a peak detector.

At step 412, as in step 406, the measured voltage and/or frequency of the secondary side winding is provided to remote computing device, such as a mobile device or computer, as diagnostic information. And in the same way, the measured voltage and/or frequency can be stored in secondary side controller memory until the diagnostic information is requested by the remote computing device (thus this step can occur after step 414 described below). The diagnostic information can be transmitted either wired or wirelessly through any suitable protocol, such as DALI, Bluetooth, ZigBee, NFC, etc. In an example, the measured voltage and/or frequency can be converted to the mains voltage and/or frequency based according, e.g., to some constant of proportionality.

At step 414, the voltage set point is returned to its value prior to the increase(s) of step 408. It remains at this voltage until the next instance that the voltage and/or frequency is to be measured while the primary side controller is in burst mode.

As described above, rather than varying the set point to determine the mains voltage, the set point can be varied to retain the primary side controller in the standard mode of operation in order to increase efficiency while the power supply is in standby. This can be accomplished by repeating the voltage set point increase of step 408 and the set point decrease of step 414 in a loop, thus maintaining the primary side controller U1 in the standard mode of operation. During this time, the output stage can be off to avoid producing an output signal while the converter produces a high bus voltage. This can be continued as long as the power supply remains in standby.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A power supply having secondary side mains measurement, comprising:

a converter configured to receive an input voltage and to supply a converted output voltage (bus voltage), the converter comprising a transformer having a primary side winding and a secondary side winding, the transformer defining a primary side and the secondary side of the power supply, the primary side being galvanically isolated from the secondary side, and a switch positioned to interrupt or permit a flow of current through the primary side winding of the transformer;

a primary side controller configured to operate the converter via a drive signal (gate drive) provided to the switch, the primary side controller operating the converter to maintain the converted output voltage at a target set point, wherein the converter is operated in a burst mode when a resistance of a load connected to an output terminal of the power supply is above a threshold and in a standard mode when the resistance of the load is below the threshold or when the primary side controller is operating the converter to increase the converted output voltage;

and a secondary side controller configured to determine a peak voltage and/or a frequency of the secondary side winding over a predetermined period of time, wherein, when the converter is in the burst mode, the secondary side controller is configured to instruct the primary side controller to increase the set point, such that the primary side controller temporarily operates in the standard mode to increase the converted output voltage, the secondary side controller determining the peak voltage and/or the frequency of the secondary side winding while the primary side controller is operating the converter in the standard mode;

wherein the set point is increased over a predetermined period of time such that the primary side controller operates the converter in the standard mode for a sufficient length of time to measure the peak voltage and/or the frequency and thereafter instruct the primary side controller to decrease the set point; and wherein the predetermined period includes at least one half cycle of the rectified mains signal such that the peak voltage is captured, or at least one rectified mains cycle, such that at least two zero crossings are detected and a mains frequency is determined, on the secondary side winding of the transformer.

2. The power supply of claim 1, wherein the secondary side controller is configured to provide to a remote computing device an estimated mains voltage and/or mains frequency based on the peak voltage and/or the frequency.

3. The power supply of claim 1, wherein the secondary side controller is configured to instruct the primary side controller to increase the set point by varying an error signal provided to the primary side controller.

4. The power supply of claim 3, further comprising an amplifier configured to produce the error signal (error sense), the amplifier receiving a first input representative of the converted output voltage (bus voltage) and a second input (bus control) being a reference input, the error signal being based on a difference between the first input and the second input, wherein the secondary side controller is configured to vary the error signal by adjusting the second input.

5. The power supply of claim 1, wherein the converter is a flyback converter.

6. The power supply of claim 1, wherein the primary side controller is a power factor correction controller.

7. The power supply of claim 1, wherein the secondary side winding is an auxiliary winding.

8. A method of secondary side mains measurement of a power supply, the method comprising the steps of:
    determining a peak voltage and/or frequency of a secondary side winding of a transformer over a predetermined period of time, wherein the transformer being employed in a converter of a power supply, the converter configured to receive an input voltage and to supply a converted output voltage (bus voltage), wherein the transformer defines a primary side and a secondary side of the power supply, the primary side being galvanically isolated from the secondary side, wherein the converter further comprises a switch positioned to interrupt or permit a flow of current through a primary side winding of the transformer, wherein the microcontroller is disposed on the secondary side of the power supply;
    determining according to the peak voltage and/or the frequency whether a primary side controller, configured to operate the converter via a drive signal (gate drive) provided to the switch, is operating in a burst mode or a standard mode, wherein the primary side controller operates the converter to maintain the converted output voltage at a target set point;
    instructing the primary side controller to increase the set point such that the primary side controller temporarily operates in the standard mode to increase the converted output voltage; and
    determining the peak voltage and/or the frequency of the secondary side winding while primary side controller is operating the converter in the standard mode;
    wherein the set point is increased over a predetermined period of time such that the primary side controller operates the converter in the standard mode for a sufficient length of time to measure the peak voltage and/or the frequency and thereafter instruct the primary side controller to decrease the set point; and
    wherein the predetermined period includes at least one half cycle of the rectified mains signal such that the peak voltage is captured, or at least one rectified mains cycle, such that at least two zero crossings are detected and a mains frequency is determined, on the secondary side winding of the transformer.

9. The method of claim 8, further comprising the step of providing to a remote computing device an estimated mains voltage and/or mains frequency based on the peak voltage and/or frequency of the secondary side winding determined while the converter is operated in the standard mode.

10. The method of claim 8, further comprising the step of instructing the primary side controller to decrease the set point after determining the peak voltage and/or the frequency of the secondary side winding.

11. The method of claim 8, wherein instructing the primary side controller to increase the set point comprises varying an error signal provided to the primary side controller.

12. The method of claim 11, wherein varying an error signal comprises increasing a reference voltage of an error amplifier, the error amplifier comparing the converted output voltage to the reference voltage.

13. A computer readable non-transitory medium having stored therein instructions for causing a processor system to execute the method of claim 8.

* * * * *